Dec. 8, 1959 A. ZACK ET AL 2,915,811
METHOD OF MANUFACTURING ELECTROMAGNETIC COILS
Filed April 19, 1954 7 Sheets-Sheet 1

INVENTORS
ALBERT ZACK
THEODORE WROBLEWSKI
BY ROGER F. DE MERRITT
Joseph C. Ryan
ATTORNEY Dec. 8, 1959 A. ZACK ET AL 2,915,811
METHOD OF MANUFACTURING ELECTROMAGNETIC COILS
Filed April 19, 1954 7 Sheets-Sheet 6

INVENTORS
ALBERT ZACK
THEODORE WROBLEWSKI
BY ROGER F. DE MERRITT
ATTORNEY

Dec. 8, 1959  A. ZACK ET AL  2,915,811
METHOD OF MANUFACTURING ELECTROMAGNETIC COILS
Filed April 19, 1954  7 Sheets-Sheet 7

INVENTORS
ALBERT ZACK
THEODORE WROBLEWSKI
BY ROGER F. DE MERRITT

ATTORNEY

United States Patent Office 2,915,811
Patented Dec. 8, 1959

2,915,811

METHOD OF MANUFACTURING ELECTROMAGNETIC COILS

Albert Zack, Beverly, Theodore Wroblewski, Danvers, and Roger F. De Merritt, Newburyport, Mass., assignors, by mesne assignments, to Sylvania Electric Products Inc., Wilmington, Del., a corporation of Delaware Application April 19, 1954, Serial No. 424,234

3 Claims. (Cl. 29—155.57)

This invention relates to electric coils and more particularly to a method of and apparatus for manufacturing wafer-type electric coils for transformers, inductors, r.f. coils, and the like.

Heretofore, in the manufacture of units of this type, it has been the practice generally to wind wire of circular cross-section on a core. Because of the sizes and shape of the wire employed, efficient space utilization has been difficult to obtain. Since many of the operations involved in the manufacture of these units are performed manually or semi-automatically, economic high-speed production also has been difficult to obtain.

An object of this invention is to provide a method of and apparatus for manufacturing electric coils automatically.

Another object is to provide a method of and apparatus for manufacturing electric coils having a high percentage of space utilization.

A further object is to provide a method of and apparatus for manufacturing electric coils more economically and at substantially higher speeds than has been attainable heretofore.

The co-pending application of Zack, Serial No. 401,333, filed December 30, 1953, and assigned to the same assignee as this application, discloses a coil made by winding a wide sheet of foil and a wide sheet of insulating material such as paper into a composite roll having alternate layers of foil and insulating material, and then slicing the composite roll into thin wafers, each of which becomes a spiral coil of rectangular cross-section wire, the turns of which are separated from one another by the turns of the insulating material.

In accordance with the principles of our invention a wide sheet of foil is wound into a roll, each layer of foil in the roll thereof being insulated from the adjacent layer either by a layer of insulating material such as paper which may be wound with the sheet of foil to form a composite roll or, as shown in the specific embodiment of our invention illustrated in the accompanying drawings, the sheet of foil may be drawn through a bath to provide it with a coating of insulating material. Each end of the roll of foil is provided with a terminal strip which may be formed from the foil itself or, if the foil in any given case is not thick enough to provide the desired rigidity, a strip of copper or other suitable material may be affixed thereto. The roll of foil is then sliced into a plurality of wafers, each of which constitutes a separate coil. The wafer coils are then etched if necessary to remove any shorts which may have developed during slicing, after which they are sprayed with an insulating material to provide a cover or coating thereover.

In one embodiment of our invention, pairs of wafer coils are affixed back-to-back in proper orientation on a mounting tape and the inner terminal tabs of each pair are connected to one another in series electrically. The mounting tape with the wafer coils affixed thereon is fed to a coil assembly mechanism which cuts the desired number of pairs of wafer coils from the mounting tape and transfers them to a coil assembly arbor. The coil assembly mechanism also includes a terminal card feeder which feeds a terminal card to the assembly arbor at the beginning and at the end of the feeding of wafer coils thereto. The adjacent external terminal tabs of each pair of wafer coils are then connected to one another electrically and the coil assembly on the assembly arbor is then transferred onto a core. A second core member is added and a suitable strap is affixed to hold the cores in abutting relationship and retain the stacked wafer coil assembly thereon.

In the specific embodiment of the invention shown in the accompanying drawings.

Figure 1:
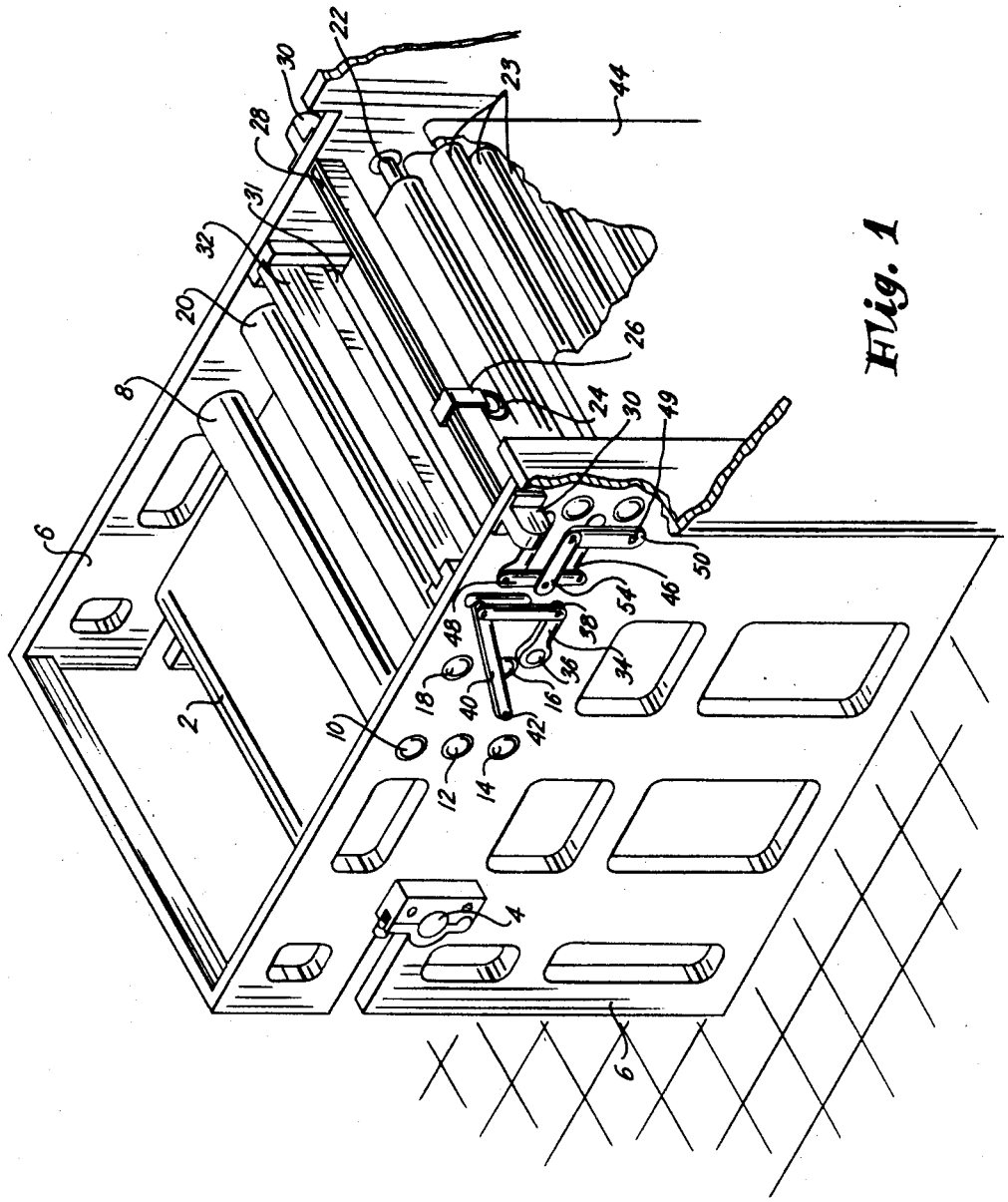
Figure 1 is a perspective view of the foil winding apparatus.

Referring now to Figure 1, a supply of metal foil 2 in the form of a roll is disposed on driven shaft 4 supported in bearings in the side walls 6. The free end of the roll of metal foil 2 is fed between a pressure roller 8 mounted on shaft 10 and a coating roller mounted on shaft 12. A coating supply roller mounted on shaft 14 is disposed in a bath of insulating adhesive material such as a polyvinyl plastic solution for example. Thus as the metal foil 2 advances between the pressure roller 8 and the coating roller mounted on shaft 12, a coating of insulating adhesive material is transferred from the coating supply roller on shaft 14 to the coating roller mounted on shaft 12. Shafts 16 and 18 support guide rollers 20 which guide the coated metal foil 2 as it is advanced toward the driven mandrel 22 on which it is to be wound.

Figure 6:
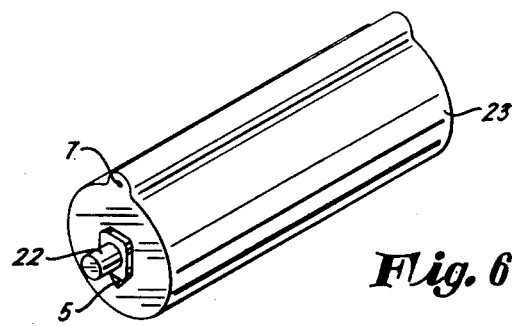
Figure 6 is a perspective view of a roll of foil wound on a mandrel by the apparatus of Figure 1.

Since in some cases the metal foil is usually so thin that it possesses very little rigidity, means are provided for affixing a terminal strip transversely across the coated metal foil 2 at each end thereof. Thus when the free end of the metal foil 2 which is to be wound on mandrel 22 reaches a point where it has been advanced through the guide rollers 20 and is disposed adjacent to the mandrel 22 on which it is to be wound, a terminal strip is attached thereto. This is accomplished by a welding wheel 24 rotatably mounted in a U-shaped bracket 26 which bridges a channel member 28 supported in the side walls 6. A pulley system or some other suitable mechanism disposed in housings 30 on the side walls 6 and connected to the bracket 26 is actuated to advance the bracket 26 along the channel member 28. An operator places a terminal strip 5 (Fig. 6) of copper or other suitable terminal material across the metal foil 2 beneath the welding wheel 24 and then actuates the mechanism which moves the welding wheel 24 across the terminal strip to effect a welding thereof to the metal foil 2.

After the desired quantity of coated metal foil has been wound on the mandrel 22, the wound portion is cut from the supply thereof by the cutter 31 which is reciprocably supported between the side walls 6. Since control over the supply must also be maintained, a weighted plate 32 is also reciprocably supported between the side walls 6, slightly to the rear of the cutter 31. Actuation of the cutter 31 is effected by clockwise rotation of lever 34 rotating about its fixed pivot 36. Link 38 connects lever 34 to cutter 31 and thus draws cutter 31 down into cutting engagement with the coated metal foil to sever it from the supply thereof, return of the cutter being effected by lever 40 mounted on spring-loaded shaft 42. At the same time the weighted plate 32 is moved down into engagement with the supply of metal foil to hold it in position with the new free end extending slightly forward thereof and in position to be drawn forward as will be described below.

After the cutter 31 has severed the metal foil, the unwound portion extending from the foil winding mandrel 22 to the cutter 31 is wound until the end thereof is in register with the welding wheel 24. An operator then positions a terminal strip 7 (Fig. 6) along the transverse edge of this end of the wound metal foil in proper orientation with respect to terminal strip 5, and actuates the welding wheel 24 as described above to affix the terminal strip 7 to this end of the wound metal foil.

The roll 23 of coated metal foil with terminal strips 5 and 7 affixed to each end thereof is then ejected from the position it occupied during the winding operation into a storage magazine 44 where a plurality of rolls of coated metal foil may be collected.

An operator then inserts a new coated metal foil winding mandrel 22 to replace mandrel 22 and actuates the mechanism for gripping the new free end of the supply of coated metal foil projecting slightly beyond the weighted plate 32. This mechanism comprises two pairs of gripping fingers, one pair disposed on each side of the side walls 6 and mounted on links 46 and 48. Lever 50 is rotated clockwise about fixed pivot 49, thereby drawing link 54 from left to right and advancing the gripping fingers connected to links 46 and 48 to draw the new free end of the coated metal foil to a position in register with the welding wheel 24 so that a terminal strip may be affixed thereto as described above. After the terminal strip has been affixed to the transverse edge of the coated metal foil, the foil is attached to the new winding mandrel 22 and winding of another roll is begun.

Figure 7:
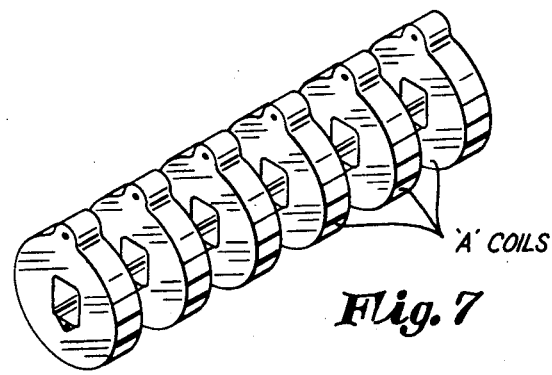
Figure 7 is a perspective view of a plurality of wafer coils sliced from the roll of coil of Figure 6 by the apparatus of Figure 2.

When the winding of the second roll has been completed, the outer terminal strip is affixed thereto. For reasons which will be explained below, the outer terminal strip on the second roll is located on the same radial line as the inner terminal strip, whereas the outer terminal strip on the first roll is located 180 degrees radially away from the inner terminal strip. For ease in identification, coils made from the first roll are termed below as A coils and coils made from the second roll are termed below as B coils. A coils are shown in Figure 7 and B coils are shown mounted on the front face of the mounting tape in Figure 8.

Figure 2:
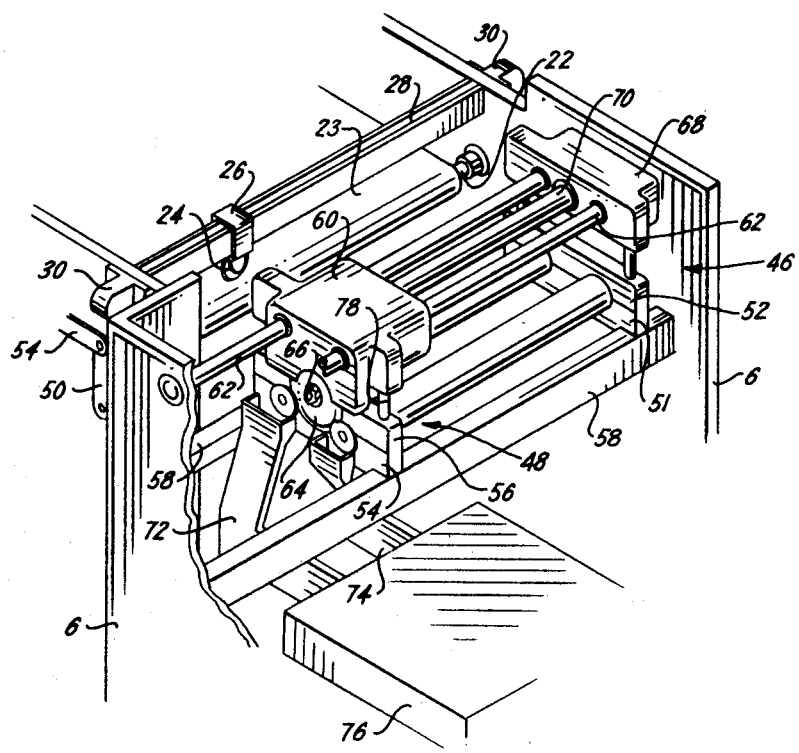
Figure 2 is a perspective view of the apparatus for slicing rolls of foil into a plurality of water coils.

The next step in the coil manufacturing process is the cutting of the rolls of metal foil 23 which were deposited in the storage magazine 44 into a plurality of individual wafer-like coils. Rolls 23 may be withdrawn from the storage magazine 44 and are placed in proper position for the cutting operation by an operator or by some suitable mechanical transfer mechanism. Referring now to Figure 2, with the mandrels 22 removed therefrom, a pair of rolls 23, with the terminal strips thereof oriented as described above, are supported at each end thereof in clamping devices 46 and 48. Clamping device 46 comprises plate 51 and vertically adjustable plate 52. Clamping device 48 comprises plate 54 and vertically adjustable plate 56. Vertical adjustment of the plates 52 and 56 is provided so that the rolls 23 may be positioned for cutting as shown in Figure 2. The plates 50 and 54 rest on angle guide rails 58 which are mounted in side walls 6.

Since the cutter mechanism must traverse the width of the rolls 23 in a plurality of steps in order to cut the rolls into a plurality of individual wafer-like coils, the cutter housing 60 is supported by and slidably disposed on guide rods 62 mounted in the side walls 6. The cutter 64 is mounted on shaft 66 which is driven by a suitable drive mechanism disposed in the cutter housing 60. A worm drive mechanism is disposed in worm drive housing 68 mounted on side wall 6 and drives worm 70 which is connected to the cutter housing 60. Flexible ducts 72 and 74 are connected at one end thereof to the plate 54 of the clamping device 46 immediately beneath and in register with the ends of the rolls 23 which project beyond the clamping device. The other end of the ducts 72 and 74 are connected to a chamber 76 which includes a suitable suction mechanism for positively transferring the individual A and B coils to the chamber 76 as they are cut from the rolls 23.

The operation of the cutter mechanism will now be described. After the pair of rolls 23 have been positioned as shown in Figure 2, the cutter drive mechanism disposed in housing 60 is energized to drive the cutter blade 64 and thereby effect severing of a wafer-like coil from the end of each roll 23, the suction mechanism in chamber 76 insuring the transfer of the wafer-like coils thereto through the ducts 72 and 74. The end of worm 70 which is disposed in housing 60 is connected through a suitable gear train to worms 78 which extend into the top of vertically adjustable plate 56. This mechanism is actuated to raise the plate 56 out of engagement with the rolls 23 and then the worm 70 draws the entire cutter assembly along the guide rods 62 and the angle guide rails 58 a distance equal to the desired thickness of the wafer-like coils being cut from the rolls 23. The worms 78 then effect a return of the vertically adjustable plate 56 into clamping engagement with the rolls 23. The cutter mechanism is again actuated and another pair of wafer-like coils are cut from the rolls 23. This sequence of operations is repeated until the rolls 23 have been cut into a multitude of wafer-like coils which have been drawn by the suction mechanism through ducts 72 and 74 into chamber 76.

The chamber 76 is provided with a pair of channels in alignment with the ducts 72 and 74 so that the wafer-like coils are advanced through these channels in a vertical position. As the coils are advanced through the channels they are etched if necessary to remove any shorts which might have developed during cutting of the coils from the roll 23, washed, treated with a neutralizing agent, washed, dried, and sprayed with an insulating material to provide a cover or coating thereover. The coils emerge from the chamber 76 into channels 80 (Fig. 3) which project therefrom.

A drum 82, disposed between channels 80 and mounted thereon, contains a roll of prefabricated tape 83 and a suitable mechanism for advancing the tape therefrom into channel 84. The prefabricated tape 83 is provided with pressure-type adhesive on both sides thereof and a plurality of spaced central openings therein registerable with the wafer coils when the latter are affixed thereto. Advancement of the tape into channel 84 is synchronized with the advancement of the wafer-like coils through channel 80 so that the coils may be affixed back-to-back on the tape as it is advanced into channel 84.

Figure 3:
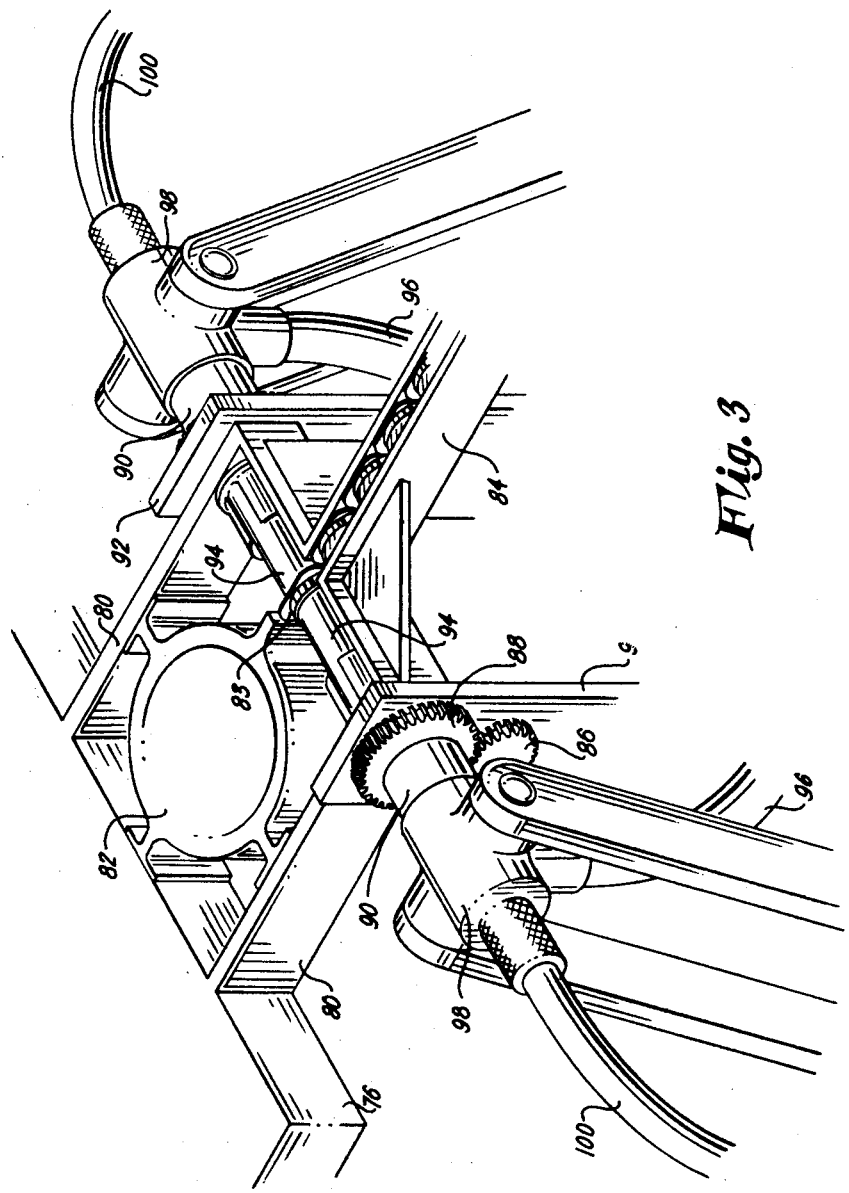
Figure 3 is a perspective view of the apparatus for orienting the wafer coils, affixing them to a mounting tape and connecting the inner terminal tabs of each pair of coils to one another.
Figure 8:
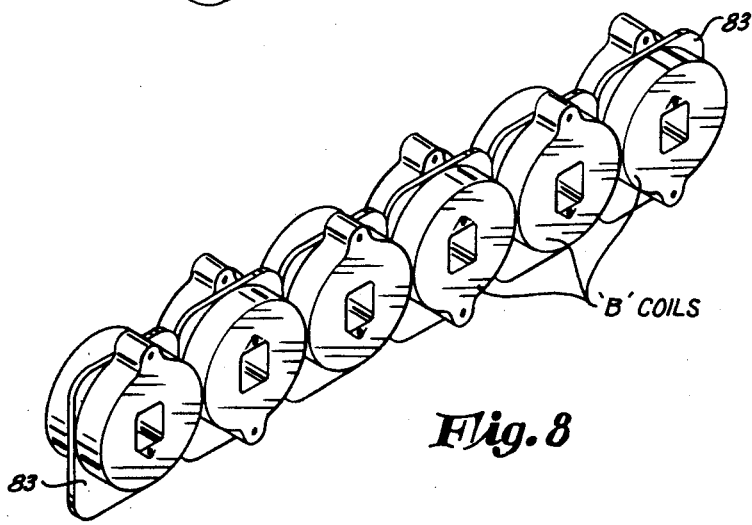
Figure 8 is a perspective view of a length of mounting tape with a plurality of wafer coils affixed thereto, as by the apparatus of Figure 3.

Since the internal and external terminal tabs on the wafer-like coils must be oriented for succeeding operations performed thereon, means are provided for effecting this operation (Fig. 3). Gear 86, driven by some suitable oscillating drive mechanism, meshes with gear 88 rotatably disposed on tube 90 and supported in a bushing in post 92. The gear 88 is connected internally of tube 90 to a plunger 94 which is reciprocably disposed within tube 90. The plunger 94 has an orienting pin projecting from its periphery at the inner end thereof. Thus when a wafer-like coil is advanced through channel 80 until it is aligned with the plunger 94, the plunger 94 is advanced by yoke 98, which is connected thereto within tube 90, until the orienting pin is disposed within the aperture in the coil. The oscillating mechanism for operating the gears 86 and 88 is then actuated and rotation of the gear 88 effects rotation of the plunger 94 and the orienting pin thereon, the orienting pin thereby moving into engagement with the protuberance defined by the inner terminal tab and rotating the coil to the pre-determined orientation. The face of the plunger 94 which abuts the coil is connected to a suction mechanism through tubing 96. After the coil has been oriented, suction is applied to effect a positive holding of the coil against the face of the plunger and the plunger 94 is advanced by the yoke 98 until the coil on the front face thereof is pressed against the tape 83. This occurs on both sides of the tape at the same time to simultaneously affix a pair of wafer-like coils A and B to the tape back-to-back (Fig. 8). Suction is then cut off to release the coil from the head of the plunger 94 and permit it to remain affixed to the tape 83.

A welding electrode, the tip of which extends out of the plunger 94 and is connected to a source of electrical energy through cable 100, is then advanced into engagement with the abutting inner terminal tabs on each side thereof and is energized to effect a welding of the inner terminal tabs of the back-to-back coils to one another. The tape 83 with pairs of coils affixed thereto back-to-back and with their inner terminal tabs welded to one another (Fig. 8) are advanced through the channel 84 to the next operation which is shown in Figure 4.

Figure 4:
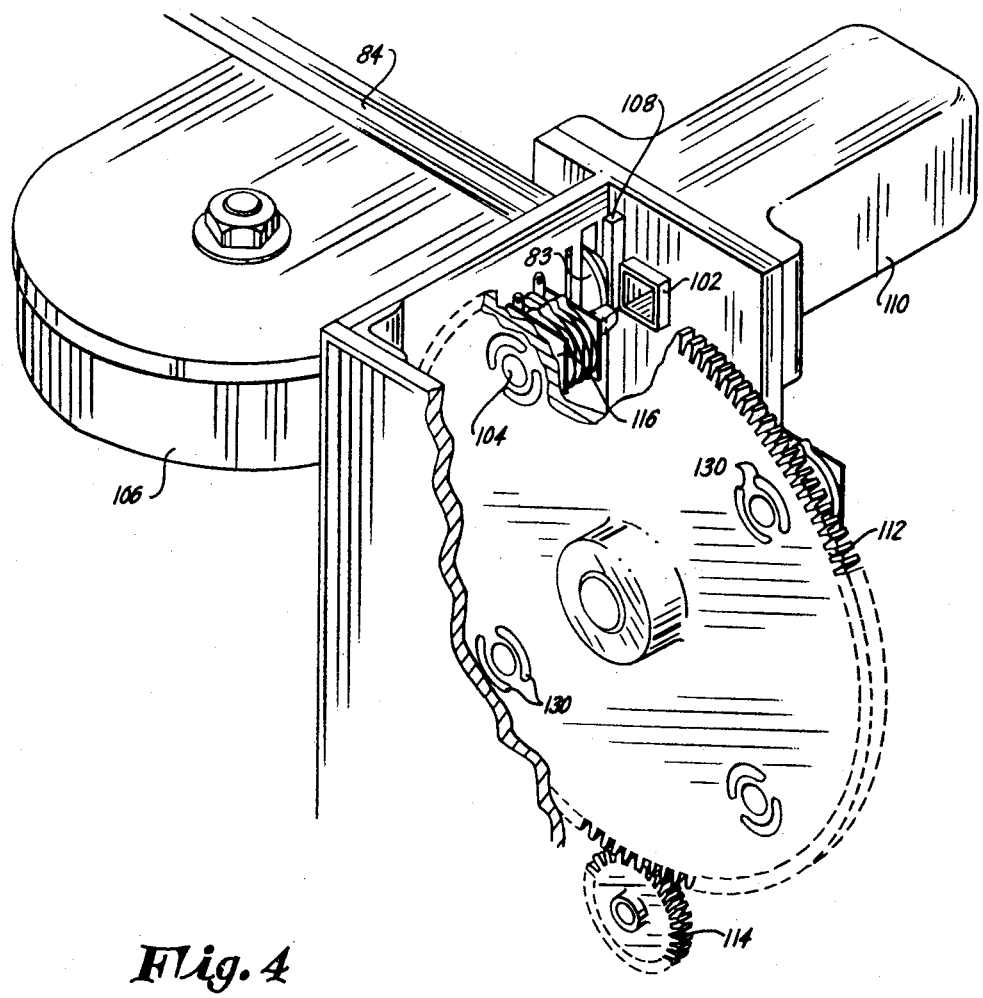
Figure 4 is a perspective view of the apparatus for assembling a plurality of pairs of wafer coils and the desired number of terminal cards.
Figure 9:
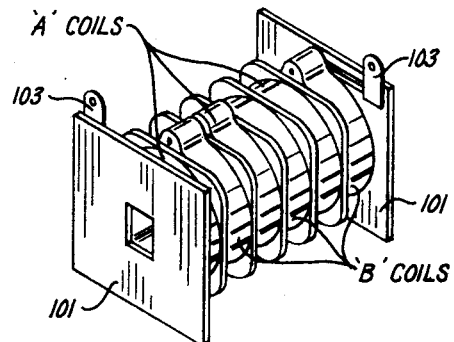
Figure 9 is a perspective view of a terminal cards-wafer coils assembly which is produced by the apparatus of Figure 4.

As shown in Figure 4, the tape 83 with wafer coils affixed thereto back-to-back emerges from channel 84 to a point where it moves into alignment with a hollow plunger 102 on one side thereof and an assembly arbor 104 on the other side thereof. A drum 106 mounted adjacent to channel 84 contains a supply of terminal cards and a feeding drive therefor. At the same time that the tape 83 with a pair of wafer coils mounted back-to-back thereon advances from the channel 84 to a position in alignment with the plunger 102 and the assembly arbor 104, a terminal card is advanced from the drum 106 to a similar position. Plunger 102 and cutter 108, actuated by a common drive mechanism disposed in housing 110, are advanced to shear the tape 83 on which a pair of back-to-back wafer coils are mounted and one terminal card from the supply thereof and push them onto the assembly arbor 104 which is mounted on gear 112. Since a plurality of pairs of wafer coils are to be stacked on the assembly arbor 104, the plunger and cutter mechanism is actuated a plurality of times to cut and transfer the desired number of coils from the tape 83, after which feeding of the tape 83 is terminated and another terminal card is advanced from the drum 106 and transferred to the assembly arbor 104 by the plunger 102. The terminal cards-wafer coils assembly is shown in Figure 9, the terminal cards 101, having terminal tabs 103 affixed thereto, are located at each end of a plurality of stacked A and B coils.

The gear 112 is indexed counter-clockwise by the gear 114 with which it meshes and which is connected to a suitable drive mechanism. At the next station on the gear 112 the adjacent external terminal tabs on the plurality of wafer coils stacked on the assembly arbor 104 are soldered to one another. This is accomplished by reciprocating a solder pot from below into and out of engagement with the terminal tabs.

Figure 5:
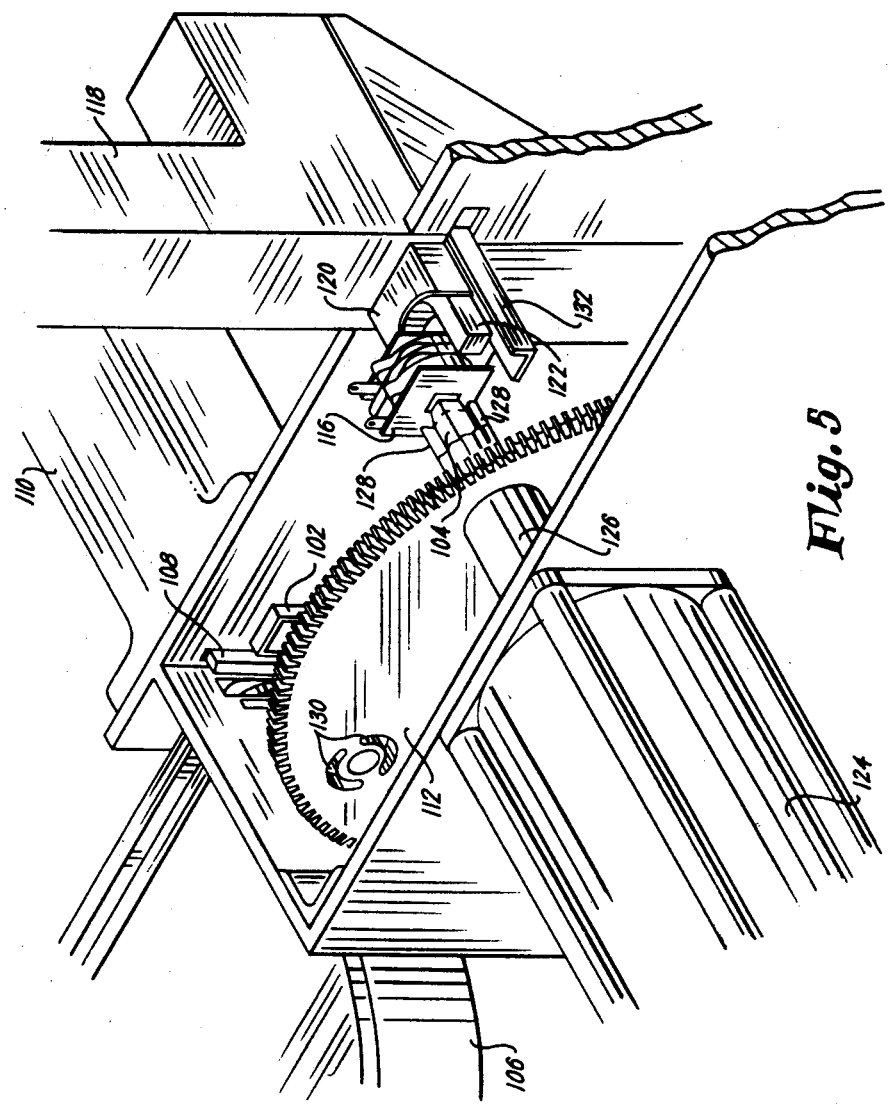
Figure 5 is a perspective view of the apparatus for transferring the terminal cards-wafer coils assembly onto a core.
Figure 10:
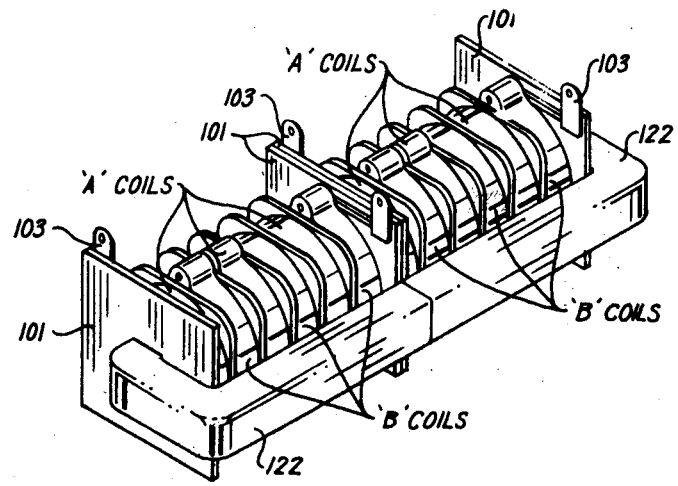
Figure 10 is a perspective view of a core-coil assembly produced by the apparatus of Figure 5.

Further indexing of the gear 112 carries the assembly arbor 104 with the stack of wafer coils and the pair of terminal cards 116 thereon to the core and coil assembly station shown in Figure 5. A magazine 118, within which a supply of horse-shoe-shaped laminated cores are disposed and from the mouth 120 of which individual cores 122 are fed, is mounted in core-feeding relationship to the assembly arbor 104 at one side of this station on the gear 112. A pneumatic cylinder 124 is located on the other side of this station on gear 112. The plunger 126 of the cylinder 124 has a pair of arcuate tongues 128 projecting therefrom which are in alignment with the arcuate slots 130 (Fig. 4) in the gear 112. After a core 122 has been moved from the supply thereof in the magazine 118 into the position shown in Figure 5, the plunger 126 of the air cylinder 124 is actuated to drive it forward, the tongues 128 thereof moving through the arcuate slots 130 in the gear 112 into engagement with the adjacent terminal card 116 to push the assembly on the arbor 104 onto the core 122. The plunger 126 is then retracted to permit subsequent indexing of the gear 112. Guide rails 132 are then retracted to permit the core and coil assembly to be removed, either manually or by some suitable transfer mechanism. A second core of similar configuration is then added to the core and coil assembly and a suitable strap or bracket is affixed to hold the cores to one another and retain the stacked wafer coil assembly thereon. A complete core-coil assembly is shown in Figure 10. In this illustration two sets of stacked coils are shown separated by a pair of abutting terminal cards 103.

What we claim is:

1. The method of making and assembling electromagnetic coils which comprises: winding, into a first roll, a sheet of foil having insulating material disposed between each turn thereof and a terminal strip along each transverse end thereof, the outer terminal strip being located 180 degrees radially away from the inner terminal strip; winding, into a second roll, a sheet of foil having insulating material disposed between each turn thereof and a terminal strip along each transverse end thereof, the outer terminal strip being located on the same radial line as the inner terminal strip; slicing said rolls to cut therefrom a plurality of wafer coils, each having an inner terminal tab and an outer terminal tab; affixing said plurality of wafer coils on a mounting tape, in back-to-back relationship, with the coils from said first roll on one face of said tape and the coils from said second roll on the other face of said tape, the outer terminal tabs of adjacent coils on each face of said tape being disposed 180 degrees radially away from one another, and the outer terminal tabs of each pair of back-to-back coils being disposed 180 degrees radially away from one another, whereby the inner terminal tabs of each pair of back-to-back coils are abutting one another; electrically connecting the inner terminal tabs of each pair of back-to-back coils to one another; and cutting said tape between adjacent pairs of back-to-back coils to provide a plurality of separate pairs of back-to-back coils.

2. The method of making and assembling electromagnetic coils which comprises: winding, into a first roll, a sheet of foil having insulating material disposed between each turn thereof and a terminal strip attached across each end thereof so as to position said terminal strips parallel to the axis of winding of the coil, the outer terminal strip being located 180 degrees radially away from the inner terminal strip; winding, into a second roll, a sheet of foil having insulating material disposed between each turn thereof and a terminal strip attached across each end thereof so as to position said terminal strips parallel to the axis of winding of the coil, the outer terminal strip being located on the same radial line as the inner terminal strip; slicing said rolls to cut therefrom a plurality of wafer coils, each having an inner terminal tab and an outer terminal tab; affixing said plurality of wafer coils on a mounting tape, in back-to-back relationship, with the coils from said first roll on one face of said tape and the coils from said second roll on the other face of said tape, the outer terminal tabs of adjacent coils on each face of said tape being disposed 180 degrees radially away from one another, and the outer terminal tabs of each pair of back-to-back coils being disposed 180 degrees radially away from one another, whereby the inner terminal tabs of each pair of back-to-back coils are abutting one another; electrically connecting the inner terminal tabs of each pair of back-to-back coils to one another; cutting said tape between adjacent pairs of back-to-back coils to provide a plurality of separate pairs of back-to-back coils; assembling said plurality of separate pairs of back-to-back coils, sequentially as cut, whereby pairs of outer terminal tabs of adjacent coils abut one another; and electrically connecting each of said pairs of outer terminals to one another.

3. The method of making and assembling electromagnetic coils which comprises: winding, into a first roll, a sheet of foil having insulating material disposed between each turn thereof and a terminal strip attached across each end thereof so as to position said terminal strips parallel to the axis of winding of the coil, the outer terminal strip being located 180 degrees radially away from the inner terminal strip; winding, into a second roll, a sheet of foil having insulating material disposed between each turn thereof and a terminal strip attached across each end thereof so as to position said terminal strips parallel to the axis of winding of the coil, the outer terminal strip being located on the same radial line as the inner terminal strip; slicing said rolls to cut therefrom a plurality of wafer coils, each having an inner terminal tab and an outer terminal tab; affixing said plurality of wafer coils on a mounting tape, in back-to-back relationship, with the coils from said first roll on one face of said tape and the coils from said second roll on the other face of said tape, the outer terminal tabs of adjacent coils on each face of said tape being disposed 180 degrees radially away from one another, and the outer terminal tabs of each pair of back-to-back coils being disposed 180 degrees radially away from one another, whereby the inner terminal tabs of each pair of back-to-back coils are abutting one another; electrically connecting the inner terminal tabs of each pair of back-to-back coils to one another; cutting said tape between adjacent pairs of back-to-back coils to provide a plurality of separate pairs of back-to-back coils; assembling said plurality of separate pairs of back-to-back coils, sequentially as cut, whereby pairs of outer terminal tabs of adjacent coils abut one another; providing the coils thus assembled with a terminal card at each end thereof; electrically connecting each of said pairs of outer terminal tabs to one another; and providing the terminal card-coil assembly with a metal core.

References Cited in the file of this patent

UNITED STATES PATENTS

| | | |
|---|---|---|
| 1,912,389 | Smith | June 6, 1933 |
| 2,334,584 | Rich | Nov. 16, 1943 |
| 2,428,385 | Reynolds | Oct. 7, 1947 |